No. 792,234. PATENTED JUNE 13, 1905.
J. T. PAGAN.
ROTARY ENGINE.
APPLICATION FILED JULY 16, 1904.
5 SHEETS—SHEET 1.
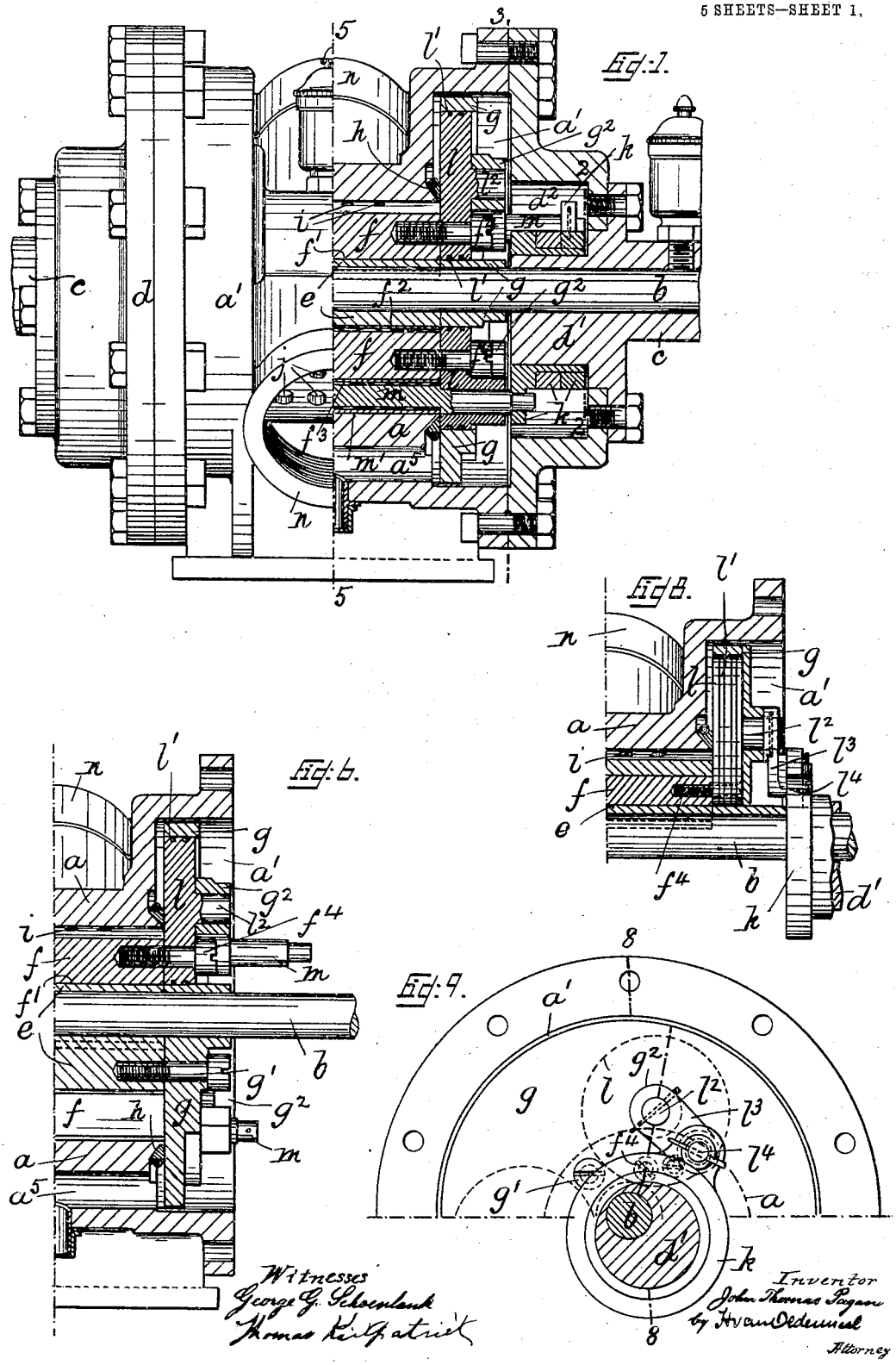

No. 792,234. PATENTED JUNE 13, 1905.
J. T. PAGAN.
ROTARY ENGINE.
APPLICATION FILED JULY 16, 1904.
5 SHEETS—SHEET 2.
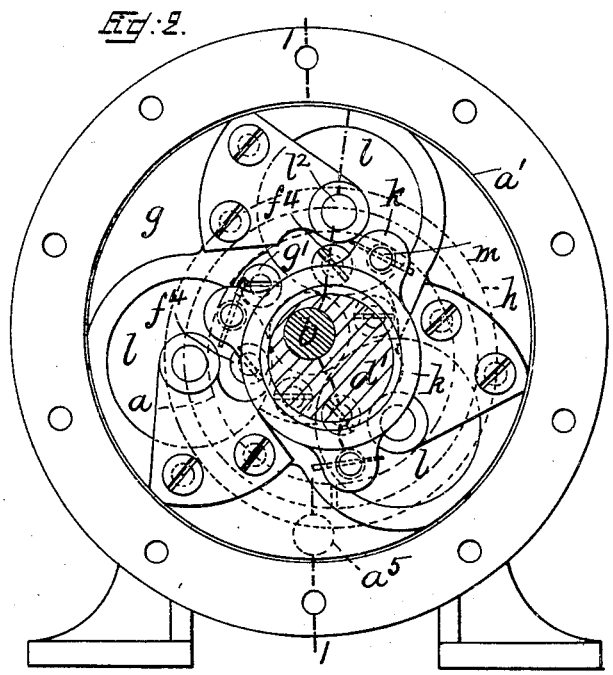
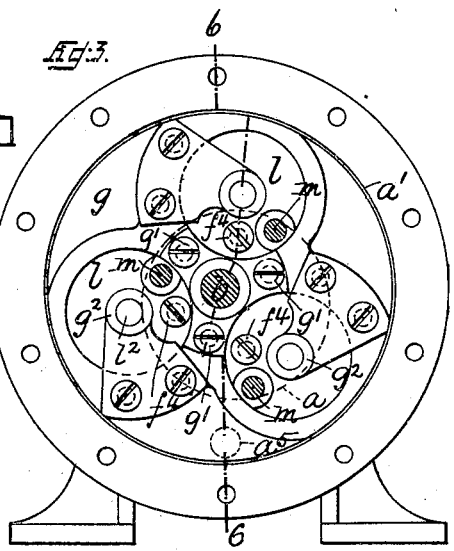
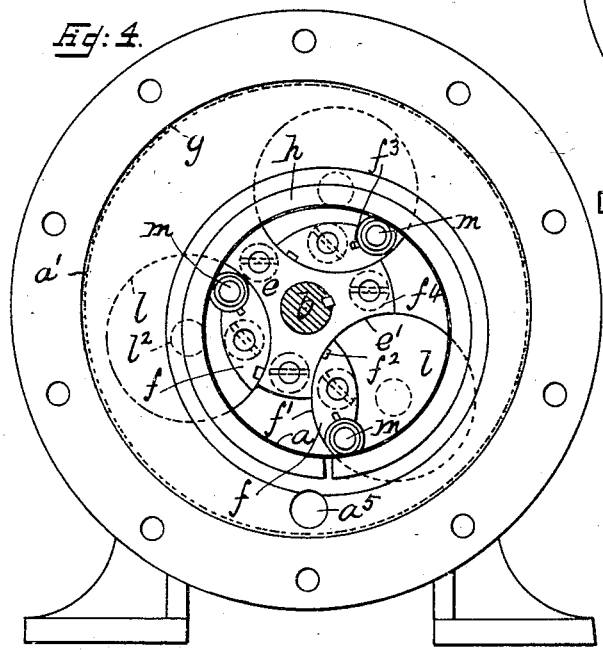
Witnesses
George G. Schoonbank
Thomas Kilpatrick
Inventor
John Thomas Pagan
by H. van de ...
Attorney No. 792,234. PATENTED JUNE 13, 1905.
J. T. PAGAN.
ROTARY ENGINE.
APPLICATION FILED JULY 16, 1904.

5 SHEETS—SHEET 3.

Witnesses
George G. Schoenlank
Thomas Kirkpatrick

Inventor
John Thomas Pagan
by H. van Dedemuul
Attorney

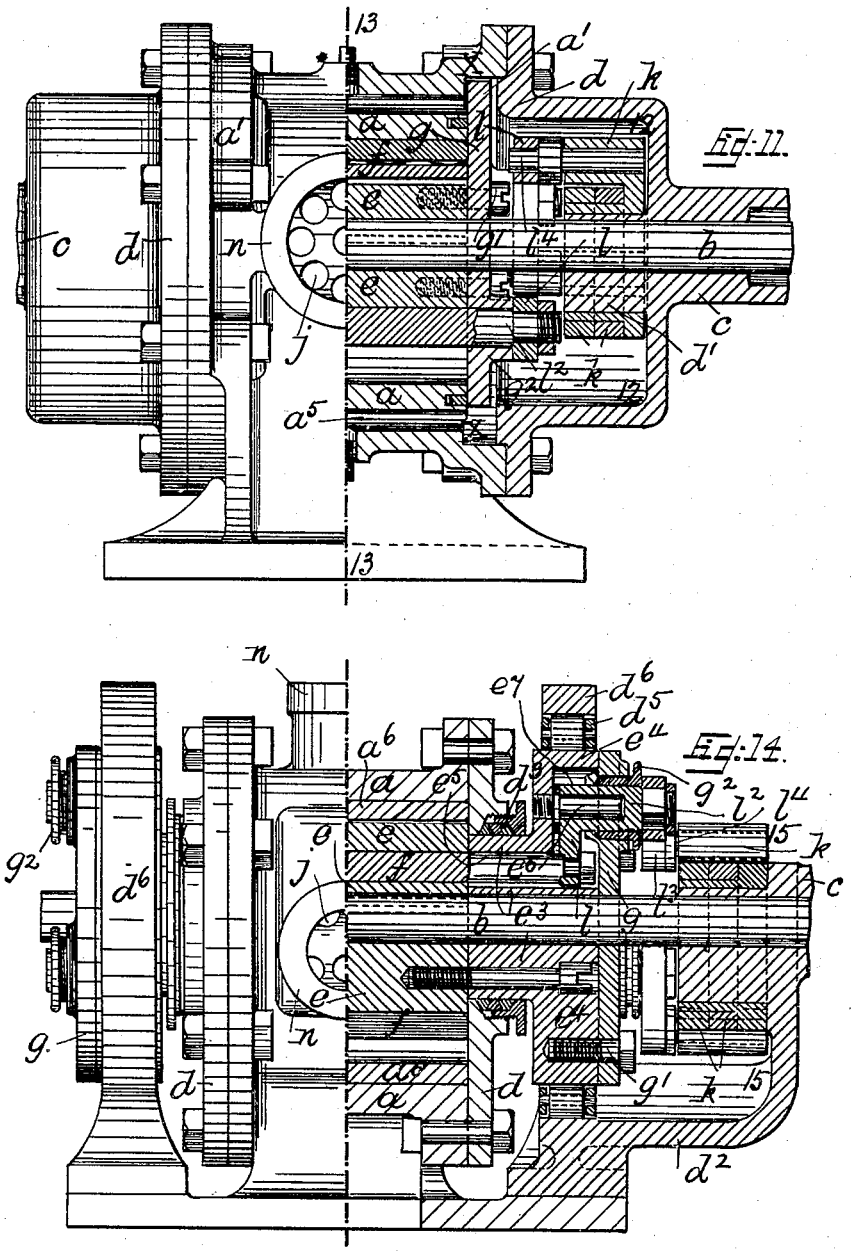

No. 792,234. PATENTED JUNE 13, 1905.
J. T. PAGAN.
ROTARY ENGINE.
APPLICATION FILED JULY 16, 1904.
5 SHEETS—SHEET 5.
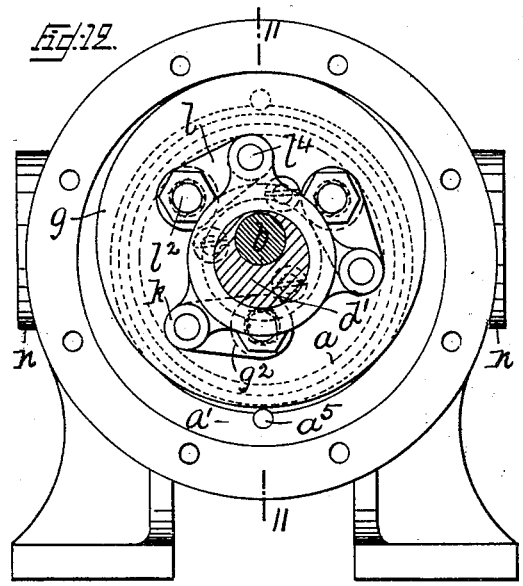
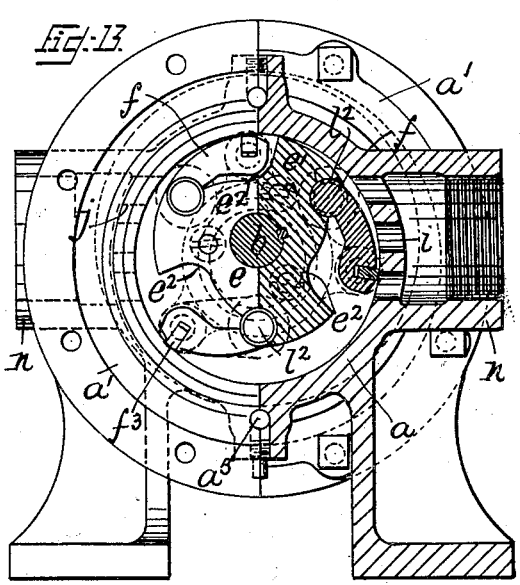
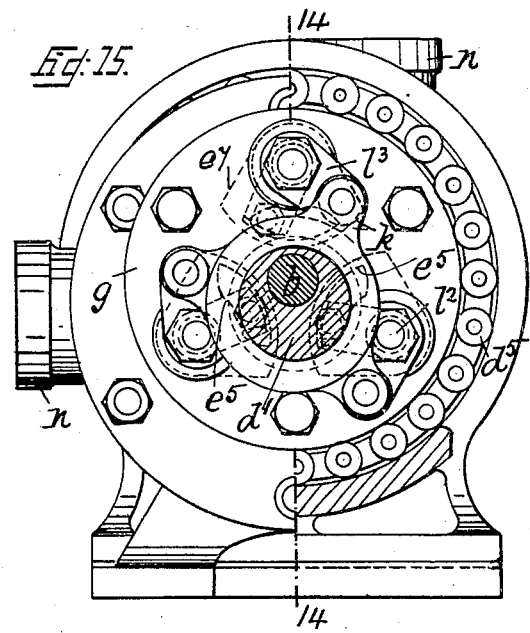
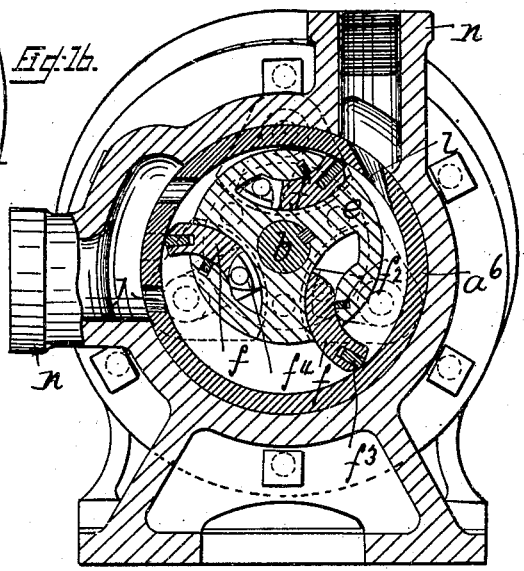
Witnesses
George G. Schoenlank
Thomas Kirkpatrick
Inventor
John Thomas Pagan
by H. van Dedemuel
Attorney No. 792,234. Patented June 13, 1905.

UNITED STATES PATENT OFFICE.

JOHN THOMAS PAGAN, OF SHEFFIELD, ENGLAND.

ROTARY ENGINE.

SPECIFICATION forming part of Letters Patent No. 792,234, dated June 13, 1905.

Application filed July 16, 1904. Serial No. 216,888.

*To all whom it may concern:*

Be it known that I, JOHN THOMAS PAGAN, a subject of the King of Great Britain and Ireland, and a resident of Sheffield, England, have invented certain new and useful Improvements in Rotary Engines and the Like, (for which I have filed an application for British Patent No. 24,067, dated November 5, 1903;) and I do hereby declare the following to be a full, clear, and exact description of the same.

This invention relates to improvements in rotary engines, and has for its object to avoid in such engines all reciprocating movements of their operating parts and all stationary grooved vane-guiding parts and the loss of power and efficiency incidental thereto, and to this end is characterized by so constructing such engines as to cause the movements of their operating parts to be only those of rotation or oscillation, whereby the engines are better adapted to serve as motors when driven by a fluid (gaseous or liquid) and as fluid (gaseous or liquid) pumps, or as exhausters, blowers, or compressors when driven by external means.

Figure 7:
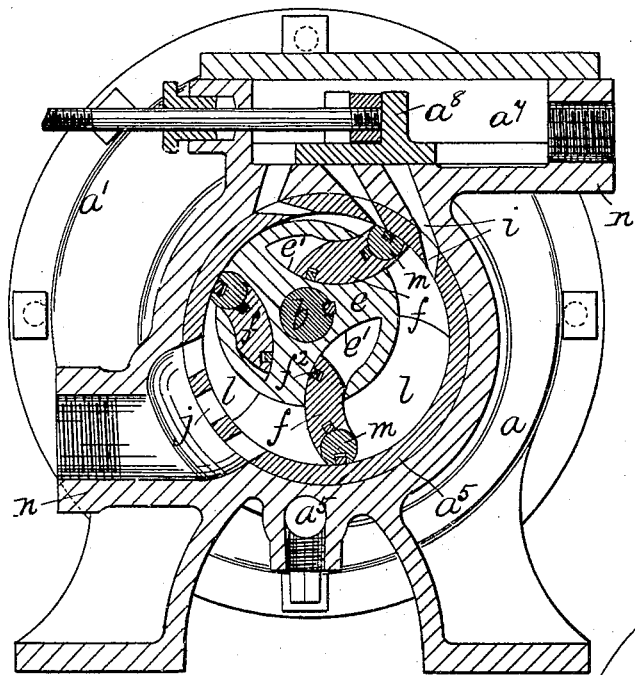
Figure 10:
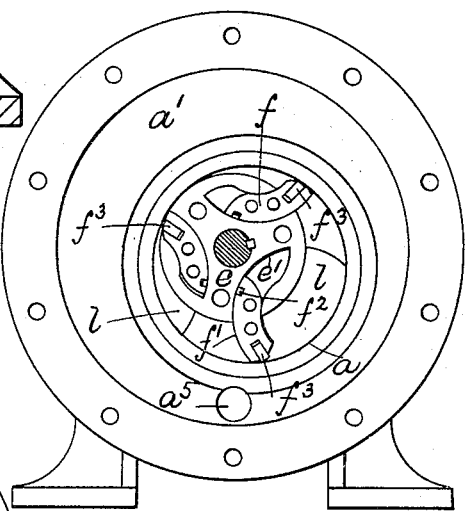
Figure 5:
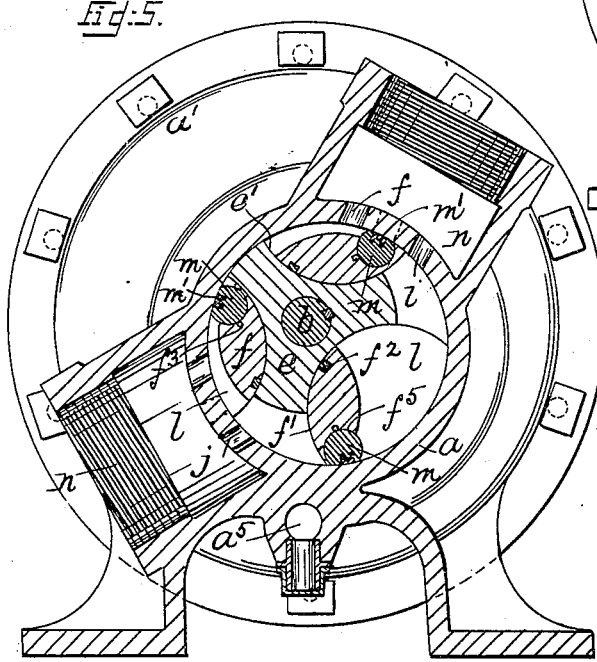

On the accompanying drawings, Figure 1 is a sectional elevation of an embodiment of the invention, the left side being in elevation and the right side in section on the irregular line 1 1, Fig. 2. Fig. 2 is a sectional elevation on the line 2 2, Fig. 1, the end cover being removed. Fig. 3 is a sectional elevation on the line 3 3, Fig. 1. Fig. 4 is an end elevation, the end cover and the cylinder-end-closing plate being removed and the shaft being shown in section. Fig. 5 is a sectional elevation on the line 5 5, Fig. 1. Fig. 6 is a part-sectional elevation on the irregular line 6 6, Fig. 3. Fig. 7 is a sectional elevation, corresponding to Fig. 5, of a modification. Fig. 8 is a part-sectional elevation on the line 8 8, Fig. 9, of another modification. Fig. 9 is an end elevation of Fig. 8. Fig. 10 is an end elevation of such modification, the end cover and the cylinder-end-closing plate being removed and the shaft shown in section. Fig. 11 is a sectional elevation of a further modification, the left side being in elevation and the right side in section on the line 11 11, Fig. 12. Fig. 12 is an end elevation, partly in section, on the line 12 12, Fig. 11, the end cover being removed. Fig. 13 is a sectional elevation, the left side being in elevation on the line X X, Fig. 11, and the right side in section on the line 13 13, Fig. 11. Fig. 14 is a sectional elevation of a further modification, the left side being in elevation and the right side in section on the line 14 14, Fig. 15. Fig. 15 is an end elevation, partly in section, on the line 15 15, Fig. 14. Fig. 16 is a sectional elevation on the line 16 16, Fig. 14.

Like reference-letters indicate like parts wherever repeated on the drawings.

$a$ is the engine-cylinder, having inlet and outlet ports $i\ j$ and connections $n$, suitable to the intended use of the apparatus and longitudinally through and in eccentric relation to which there passes a shaft $b$, adapted to rotate in external bearings $c$. Fast on and concentric and rotatable with the shaft is mounted a drum $e$ of the length of the cylinder and of a diameter determined by the radius of shortest length from the shaft center to the cylinder inner periphery, the drum having in its periphery a recess or recesses $e'$ of circular or sectoral formation. In each drum-recess is located a vane $f$, which is adapted to be oscillated in the recess about a fulcrum or center $l^2$, to which the surface of the recess is circumferential, and to be carried around by the drum within the cylinder and to act as a valve to said ports and a piston to the cylinder alternately, fluid-tight contact of the vane with the drum-recess and cylinder periphery being maintained by suitable packing.

At each end of the drum is secured by screws $g'$ or otherwise a plate $g$, concentric and rotatable with the shaft. In the arrangements of Figs. 1 to 13 the plates $g$ are located adjacent to the drum and cylinder ends and inclosed in chambers $a'$ by chambered coverplates $d$, bolted to the cylinder ends, while in the arrangement of Figs. 14 to 16 the plates $g$ are located adjacent to the drum ends externally of the plates $d$.

The oscillation of each vane in its drum-recess is effected once in each rotation of the shaft and drum by means of eccentric sleeves $k$ and crank connections $l$, located at one or at each end of the engine, each sleeve being mounted on and adapted to rotate about a stationary boss $d'$, supported by the adjacent cover-plate $d$, Figs. 1 to 13, or by a bracket $d^2$, Figs. 14 to 16, concentric with the cylinder and externally of the adjacent plate $g$ and each crank connection being mounted in and rotatable with the adjacent plate $g$ and having its fulcrum $l^2$ in alinement with the center of the drum-recess of its respective vane and being connected at the inner side of or next adjacent to such plate to the vane and at the outer side of or farthest from such plate to the sleeve.

In the vane-oscillating arrangement shown in Figs. 1 to 6 each vane is secured at each end, as by a screw $f^4$, to a disk $l$, having an axle $l^2$, mounted in a bearing $g^2$, carried by the adjacent plate $g$. Each vane's two disks $l$ are connected by a rod $m$, which passes through and rigidly connects the vane's two sleeves $k$, passes freely through the disks and between the latter, passes through the cylinder in a seating $f^5$ in the vane, and thus serves as part of the vane and as a crank-pin in relation to the vane's disks, whereby as the drum and the plates $g$ are rotated with the shaft about its axis as a center the vane's two sleeves $k$ are rotated about the cylinder-axis as a center and the vane's two disks $l$ are caused to oscillate in their seatings in the plates $g$, and the vane is caused to oscillate in its drum-recess all once in each rotation of the shaft. In said oscillating movements fluid-tight relation is insured between the vane and the drum-recess at $f^2$, between the vane and the rod $m$ at $f^3$, between the rod and the cylinder periphery at $m'$, between the disks $l$ and the plates $g$ at $l'$, and between the latter and the cylinder ends at $h$.

$a^5$ is a channel connecting the end chambers $a'$ and serving for balancing the pressure therein and for letting off fluid which may obtain access thereto.

In the arrangement shown in Fig. 7 the vane is made of a sectoral formation and adapted to oscillate in a sectoral drum-recess. The cylinder also has a liner $a^6$, having the inlet-ports arranged in the direction of rotation of the drum, and a steam-chest $a^7$, having a valve $a^8$, which can be set to cut off the steam at any desired point.

In the arrangement shown in Figs. 8 to 10 each vane maintains fluid-tight relation with the cylinder by packing $f^3$, and the axles $l^2$ of the vane's two disks $l$ project through the plates $g$ and are keyed to crank-arms $l^3$, having pins $l^4$, which loosely connect with the sleeves $k$, each opposite pair of which are thus adapted to oscillate a vane.

In the arrangement shown in Figs. 11 to 13 each vane has at each of its inner ends a stem or shank $l^2$, which projects through a bearing $g^2$ in the adjacent plate $g$ and externally of such plate is made fast to one end of a crank-arm $l$, which at its other end has a pin $l^4$, which loosely connects with the adjacent sleeve $k$ in alinement with the longitudinal center of the vane's outer end, and the drum periphery is further recessed at $e^2$ to accommodate the vane in its inward oscillation.

In the arrangement shown in Figs. 14 to 16, wherein the vane-oscillating parts are arranged externally of the cover-plate $d$, the drum is provided at each end with a concentric extension $e^3$, which passes through the plate $d$ in fluid-tight relation insured by packing $d^3$ and has an enlarged head $e^4$, against the face of which the plate $g$ is secured, and also a sectoral slot $e^5$, one for each vane, corresponding with and opening into a drum-recess $e'$, and through which there projects from the vane's inner end a stem or shank $f^4$, which is connected to the sleeve $k$ by a bell-crank $l$. The crank-fulcrum $l^2$ passes through a gland $g^2$, located in the plate $g$, and may also engage with a center pin $e^6$, located in the drum-head, and one arm of the crank works in a recess $e^7$ in the drum-head and is rigidly connected to the vane-stem $f^4$, and its other arm $l^3$ works externally of the plate $g$ and has a pin $l^4$, which is loosely connected to the sleeve in alinement with the longitudinal center of the vane's outer end, so that as the shaft is rotated each crank is caused to oscillate about its fulcrum and each opposite pair of sleeves is thus adapted to oscillate a vane in its drum-recess.

Thus in the operation of the improved engine the movements of its parts are those of rotation and oscillation, the oscillations of the vanes being caused by the relative positions of the centers of their operating parts and the rotation thereof, the centers about which the vanes oscillate being carried around in a path concentric with the drum, while the oscillations of the vanes about such centers are caused by the crank-like action of the parts rotating with the shaft and connecting the sleeves and vanes.

The cylinder and cover-plates may be made in half parts divided longitudinally to facilitate access to the inclosed mechanism, and the load of the drum may be taken by roller-bearings $d^5$, working in a roller-race $d^6$, as shown in Figs. 14 to 16.

What I claim as my invention, and desire to secure by Letters Patent, is—

1. In a rotary engine: in combination with a cylinder having approximately opposite inlet and outlet ports and a shaft passing eccentrically through it and adapted to rotate in external bearings: a drum mounted concentrically on and rotatable with the shaft, extending lengthwise through the cylinder and working adjacent to its periphery at one part and sectorally recessed in its own periphery: a vane extending from end to end of each drum-recess and adapted to oscillate therein about a center to which the recess is circumferential and rotatable with the drum and serving as a valve to said ports and a piston to the cylinder: plates concentric and rotatable with the shaft and located one adjacent to each drum end: stationary cover-plates located one adjacent to each cylinder end: stationary bosses concentric with the cylinder and arranged one externally of each drum end plate: sleeves two to each vane mounted one on each stationary boss and rotatable thereabout: and crank connections one to each sleeve and two to each vane mounted one in and rotatable with each drum end plate with its fulcrum in alinement with said center of the drum-recess of its respective vane and its ends connected respectively to the vane and to its respective sleeve: whereby, on the operation of the engine by fluid passing through the cylinder or by the rotation of the shaft by external means, the rotation of the drum and drum end plates about the shaft-axis and the rotation of the sleeves about the cylinder-axis cause an oscillation of the crank connections of each vane and a consequent oscillation of the vane in each rotation of the shaft, as set forth.

2. In a rotary engine: in combination with a cylinder having approximately opposite inlet and outlet ports and a shaft passing eccentrically through it and adapted to rotate in external bearings: a drum mounted concentrically on and rotatable with the shaft, extending lengthwise through the cylinder and working adjacent to its periphery at one part and sectorally recessed in its own periphery: a vane extending from end to end of each drum-recess and adapted to oscillate therein about a center to which the recess is circumferential and rotatable with the drum: plates concentric and rotatable with the shaft and located one adjacent to each drum and cylinder end in a chambered extension of the cylinder end: stationary chambered cover-plates located one adjacent to each cylinder chambered extension: stationary bosses located by and within said cover-plates concentric with the cylinder and arranged one externally of each drum end plate: sleeves two to each vane mounted one on each stationary boss and rotatable thereabout: and crank connections one to each sleeve and two to each vane, each comprising a disk mounted and adapted to oscillate in and rotatable with the drum end plate with its center in alinement with said center of the drum-recess of its respective vane and made fast to the vane, and the two being connected by a rod which rigidly connects the two sleeves passes freely through the two disks and between the latter passes through the cylinder in a seating in the vane, and thus, while serving conjointly with the vane to divide the cylinder-cavity, acts as a crank-pin to the disks, whereby, as the drum and drum end plates are rotated with the shaft about its axis, the vane's two sleeves are rotated about the cylinder-axis and the vane's two disks are oscillated in their carrying-plates and the vane is oscillated in its drum-recess in each rotation of the shaft, as set forth.

In testimony whereof I have signed this specification in the presence of two subscribing witnesses.

JOHN THOMAS PAGAN.

Witnesses:
   Thos. Johnson,
   Chas. N. Daniels.